United States Patent [19]

Hicks et al.

[11] 4,348,719

[45] Sep. 7, 1982

[54] STATIC INVERTER WITH ENERGY RETURN

[75] Inventors: Graham P. Hicks, Guildford; Michael C. Carter, Dorking, both of England

[73] Assignee: ERA Patents Limited, Leatherhead, England

[21] Appl. No.: 86,359

[22] Filed: Oct. 19, 1979

[30] Foreign Application Priority Data

Oct. 23, 1978 [GB] United Kingdom ............... 41632/78

[51] Int. Cl.³ .......................................... H02M 7/537
[52] U.S. Cl. ...................................... 363/132; 363/16; 363/98
[58] Field of Search ....................... 363/16, 21, 97, 98, 363/132, 15, 41, 137, 138; 323/224, 271

[56] References Cited

U.S. PATENT DOCUMENTS

| | | | |
|---|---|---|---|
| 3,310,730 | 3/1967 | Ruch | 363/98 |
| 3,423,663 | 1/1969 | Payne | 363/41 |
| 3,514,688 | 5/1970 | Martin | 363/132 X |
| 3,641,422 | 2/1972 | Farnsworth et al. | 323/224 |
| 3,742,330 | 6/1973 | Hodges et al. | 363/41 |
| 3,879,647 | 4/1975 | Hamilton et al. | 363/16 |
| 3,970,916 | 7/1976 | Kienscherf | 363/41 X |
| 4,095,166 | 6/1978 | Shibata et al. | 323/271 |
| 4,097,863 | 6/1978 | Chambers | 363/16 X |
| 4,124,885 | 11/1978 | Nordby | 363/98 X |
| 4,178,629 | 12/1979 | Allen et al. | 363/97 X |

FOREIGN PATENT DOCUMENTS

2752108 6/1978 Fed. Rep. of Germany .
1393637 5/1975 United Kingdom .

Primary Examiner—A. D. Pellinen
Attorney, Agent, or Firm—Kemon & Estabrook

[57] ABSTRACT

In a static inverter for providing a low-frequency output (e.g. 60 Hz) from a d.c. supply, the passage of low-frequency currents through the inverter transformer is avoided by producing a train of high-frequency pulses (e.g. 40 kHz) which represent, for example by their pulse widths, the successive instantaneous amplitudes of the required low-frequency voltage. These pulses cause a train of corresponding pulses to be produced at the secondary of the transformer, and this train is filtered to produce a unidirectional voltage having the desired instantaneous amplitudes. This voltage is fed to a transistor switching bridge which changes the unidirectional voltage into an alternating voltage having the required low frequency. A circuit is preferably provided to allow regeneration of power from the load back into the d.c. supply.

24 Claims, 7 Drawing Figures

STATIC INVERTER WITH ENERGY RETURN

This invention relates to static inverters for supplying, from a d.c. source, an alternating voltage at a relatively low frequency, for example at a frequency below about 1 kHz.

Static inverters for supplying power at mains frequency (i.e. 50 Hz or 60 Hz) are well-known, for use, for example, as stand-by power supplies. In general, such inverters suffer from a considerable disadvantage that an output transformer designed for mains frequency operation must be used in order to provide the required voltage step-up. This transformer is necessarily a heavy and large iron-cored component. Furthermore, the a.c. currents flowing in the transformer windings cause low-frequency vibrations to be set up in the transformer core. These vibrations are within the audible frequency range, and the amount of noise produced by the core can be objectionable.

It is an object of the present invention to provide an improved static inverter, wherein the transformer operates at a much higher frequency than the required output frequency. The operating frequency is preferably above 20 kHz, so that any vibrations set up in the transformer are outside the audible frequency range.

According to the invention, a static inverter for connection to a d.c. supply to provide a relatively low-frequency alternating voltage output comprises means to generate a relatively high-frequency train of pulses, successive pulses representing required successive instantaneous amplitudes of the alternating voltage output to be provided; means to cause the passage through a transformer primary winding of pulses of current from the d.c. supply in response to the pulse train so that a corresponding pulse train is induced across a secondary winding of the transformer; means to produce from said corresponding pulse train a unidirectional voltage having said required instantaneous amplitudes; and switching means to which said unidirectional voltage is fed and which provides said alternating voltage output by cyclically reversing the polarity of said voltage at said relatively low frequency.

An embodiment of the invention will now be described, by way of example, with reference to the accompanying drawings, in which.

Figure 1:
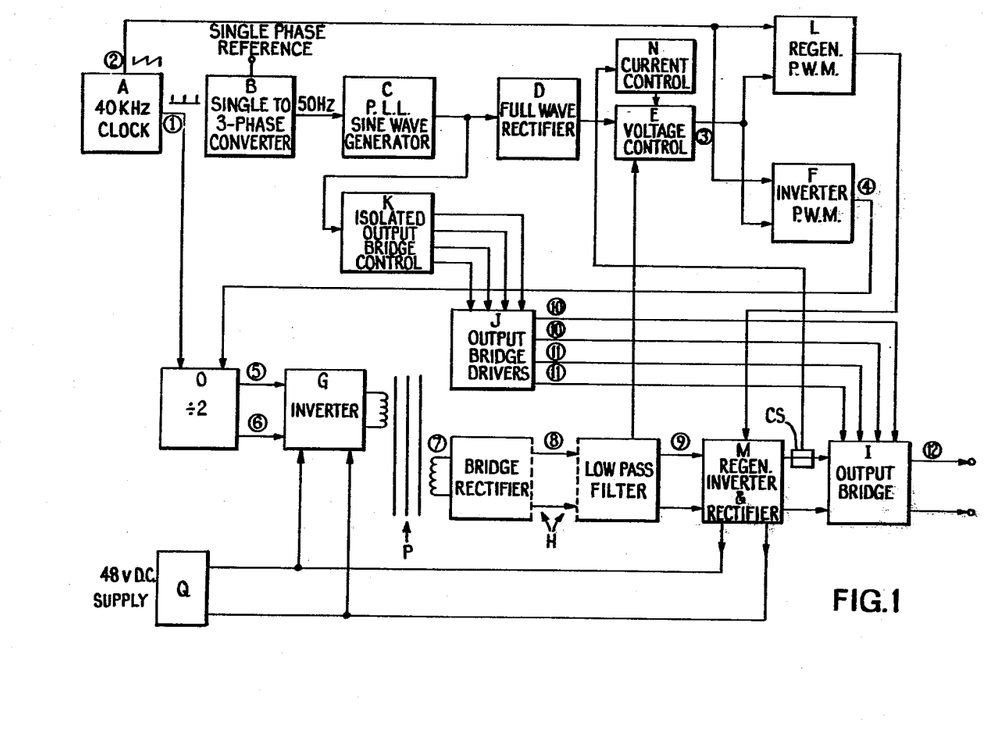
FIG. 1 is a schematic block diagram of an inverter according to the invention.
Figure 2:
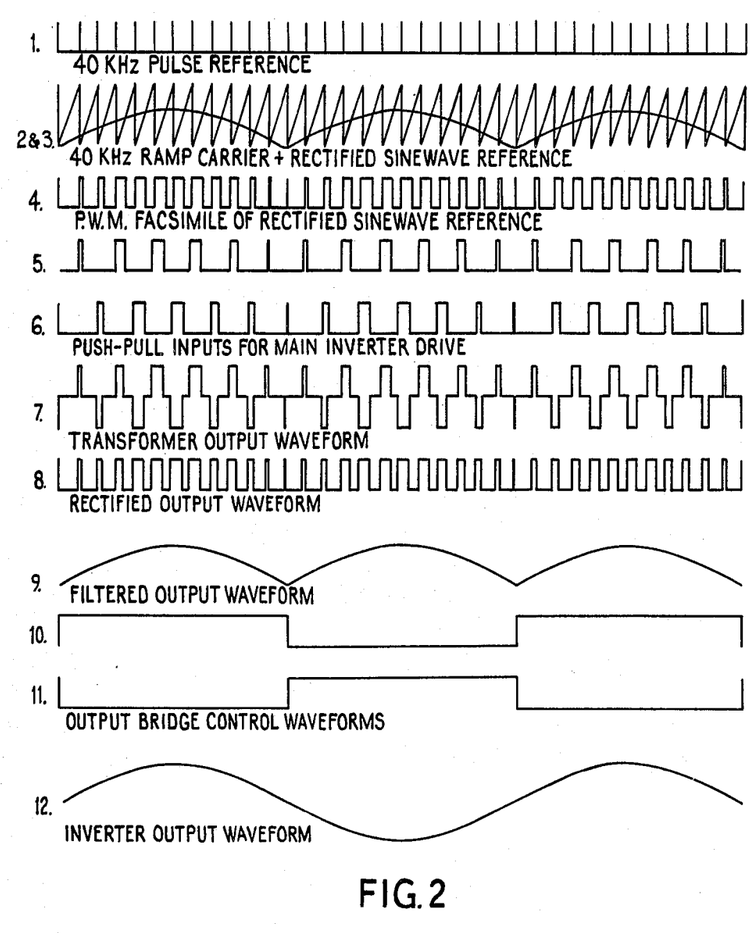
FIG. 2 illustrates some of the waveforms produced in the inverter.

Referring to FIGS. 1 and 2 of the drawings, the inverter includes a clock pulse generator A which generates clock pulses at a 40 kHz repetition rate (see waveform 1 in FIG. 2). The generator also produces sawtooth pulses at the same frequency (waveform 2). A converter B produces a 3-phase wave from a single phase reference sine wave. One of the outputs of the converter B is fed to a sine wave generator C which is connected in a phase-locked loop so that the sine wave is maintained exactly in phase with the square wave. The sine wave is then fed to a full-wave rectifier circuit D which produces a rectified sine wave.

This signal is fed to a voltage control circuit E, which sets the output voltage obtainable from the inverter. Associated with the circuit E is a current regulator circuit N which monitors the output current from the inverter, via a current shunt CS. The output of the circuit E acts as a recitified sine wave reference signal (waveform 3).

The reference signal is fed to a pulse-width modulator F, along with the sawtooth ramp signal from the clock pulse generator A. The reference signal and the sawtooth signal are compared and the circuit produces a pulse-width modulated signal (waveform 4), the width of each successive pulse representing the amplitude of the reference sine wave at that instant. It should be realised that whereas for clarity only 12 sawtooth pulses are shown for each a.c. half-cycle in FIG. 2, there will in fact be 400 pulses per half-cycle.

In order to provide drive pulses for a push-pull transistor inverter G, a divide-by-two circuit O steers alternate pulses of the pulse-width modulated signal into two paths to form two pulse trains (waveforms 5 and 6).

The inverter G is fed from a 48 v d.c. supply Q, and comprises transistors R,S (FIG. 5) which are switched on alternately, by the two pulse trains, to pass current alternately through two halves of a transformer primary winding. The transformer P carries only these high-frequency current pulses, and so can be designed as a pulse transformer with a relatively small ferrite core. The resultant voltage across the transformer secondary winding is shown as waveform 7.

This voltage is fed to a bridge rectifier and low pass filter circuit H which turns the alternately positive and negative pulse-width modulated pulse train back into a train of unidirectional pulses (waveform 8) corresponding to the waveform 4. It will, of course, be realised that although the various waveforms in FIG. 2 are all shown with comparable amplitudes, this is merely for the sake of convenience. The amplitudes will, in practice, be widely different. For example, the clock pulses (waveform 1) may have an amplitude of approximately 15 v, whilst the output pulses from the transformer (waveform 7) may be 700 volts peak-to-peak, depending upon the chosen transformer turns ratio.

The transformer output is fed to the low-pass filter which changes the 40 kHz pulse-width modulated signal into a rectified sine wave (waveform 9) similar to the waveform 3 but of much larger amplitude.

This signal is unidirectional, and is changed into a normal sine wave by a transistor bridge I which comprises two pairs of transistors which are made to conduct alternately by two antiphase rectangular waves (waveforms 10 and 11) from an output bridge control circuit K. These waves are fed to an output bridge driver circuit J. The output from the bridge, which forms the inverter output, is a sine wave of, say, 240 volts rms (waveform 12) which can, for example, be used to supply one or more appliances in the event of failure of the mains supply.

Because of the presence of the bridge rectifier H in the inverter output path, power would not be able to flow from the load back to the d.c. supply Q. Hence, the inverter would not be able satisfactorily to supply low power-factor loads. At best, severe distortion of the output waveform would occur. Circuitry is therefore provided to allow excess power from the load to bypass the rectifier H.

The current and voltage control circuits N and E provide an indication of the excess power situation by supplying a negative output signal which is fed to a regeneration pulse-width modulator circuit L. This operates in a similar manner to the circuit F to provide a pulse-width modulated pulse train for driving a regeneration inverter M. This inverter includes a rectifier circuit which feeds the excess power from the inverter M directly back into the d.c. supply Q.

FIGS. 3-6 together form a circuit diagram showing suitable circuitry for each of the blocks of FIG. 1.

The circuit operation of the blocks A to O will now be described briefly. It is considered that the provision herein of a detailed description of each circuit is not necessary, since suitable circuits for use in the individual blocks are well known.

Figure 3:
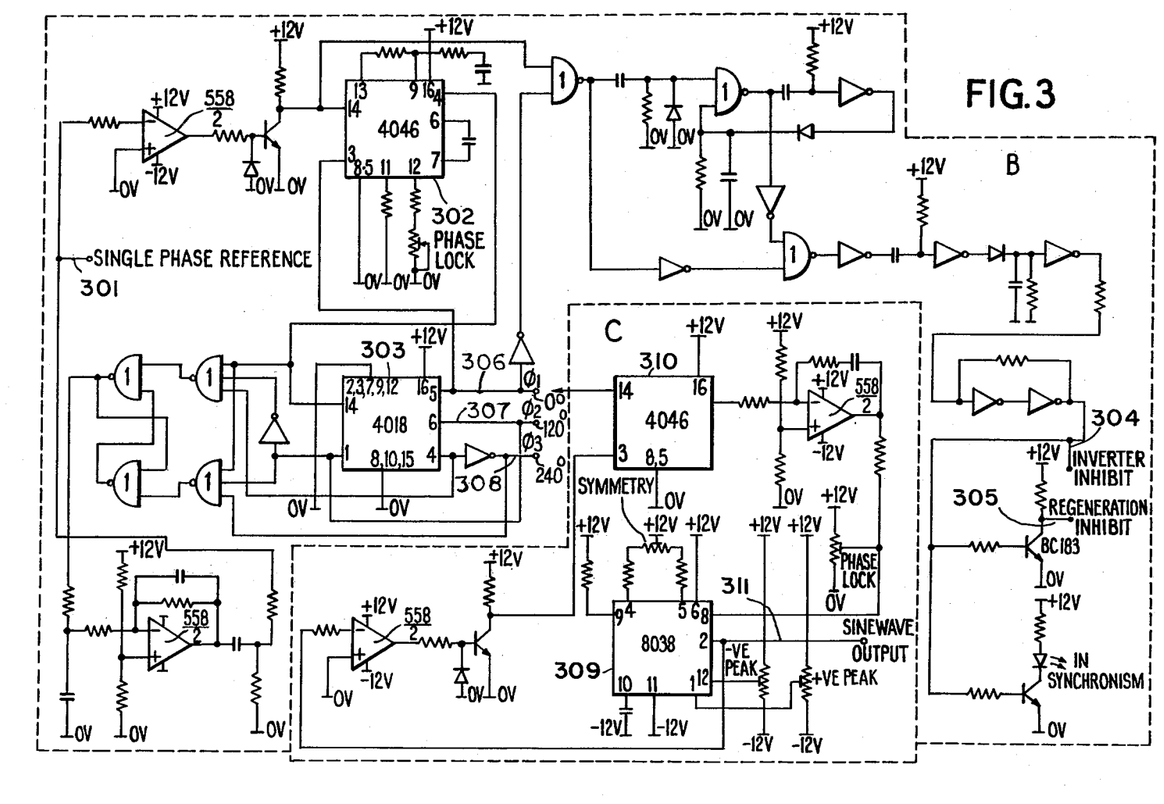
FIGS. 3 to 6 together form a circuit diagram of the inverter.

Referring to FIG. 3, the circuit B acts as a phase-splitter to allow the inverter to be synchronized either in phase, displaced by 120° or displaced by 240°, from an external single-phase reference input on a line 301. A phase-locked loop circuit 302 runs at a frequency six times as high as the fundamental output frequency by employing a divide-by-six circuit 303 to drive the circuit 302. When synchronized, the detectors release inverter inhibit and regeneration inhibit signal lines 304, 305, respectively, and the inverter operates. Three outputs 306, 307 and 308, respectively, from the circuit 303 allow the above-mentioned choice of phase displacement.

Circuit C is the reference sine wave generator. A sine wave oscillator 309 is connected in a phase-locked loop with a circuit 310, which receives the phase reference output from the circuit 303, so that the oscillator 309 is synchronized therewith. The reference sine wave is fed out on a line 311.

Figure 4:
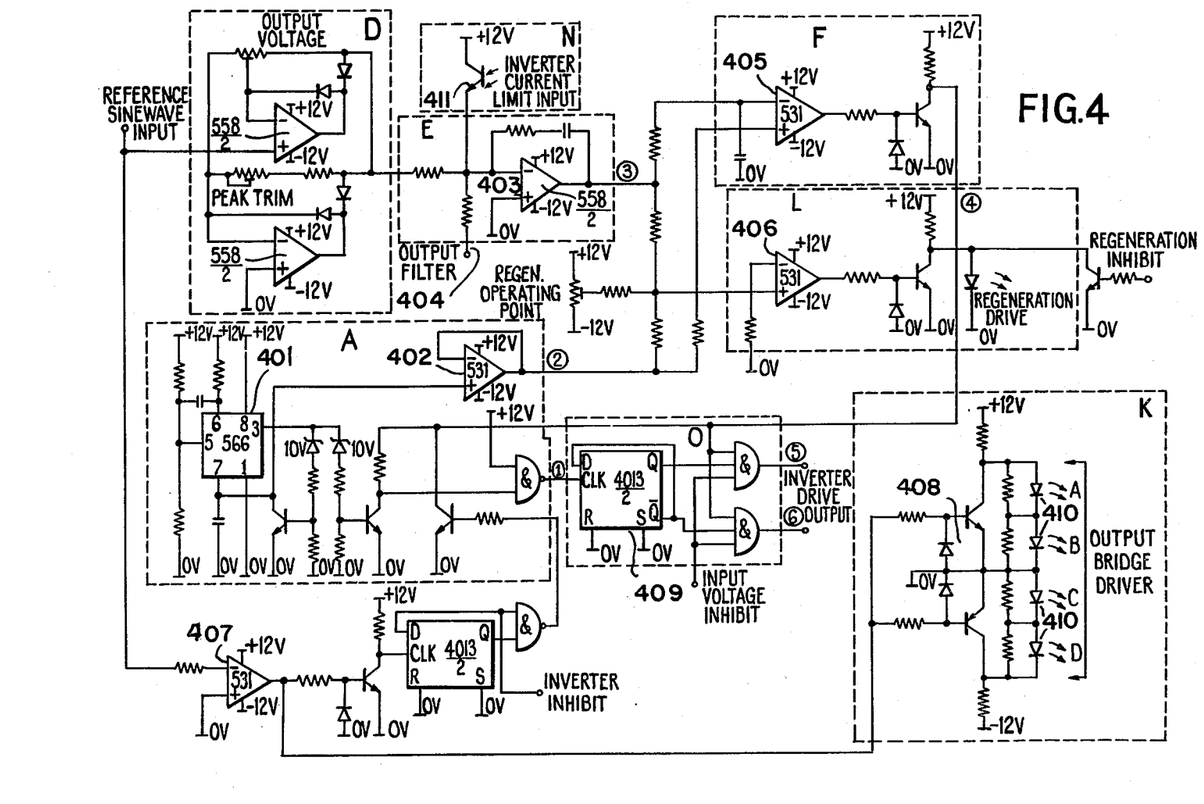

Referring to FIG. 4, the circuit A produces a 40 KHz sawtooth waveform which appears at pin 7 of an oscillator circuit 401. This waveform is buffered by a voltage divider 402 and appears at output point 2. A clock pulse train is also derived from the oscillator circuit 401 and is buffered and fed out from output point 1.

The circuit D acts as a precision full-wave rectifier with variable gain, for setting the amplitude of the inverter output.

Circuit E comprises a summing amplifier 403 which has the rectified sine wave reference from the circuit D as one input and, in anti-phase, the unidirectional inverter output on a line 404 as the second input. In normal operation an error or difference signal appears at output point 3 to modulate the inverter. In a current overload condition a third input contributes to the summing point from the current limit circuit N, to reduce the modulation and to provide a current limiting action to protect the inverter.

Circuit F and L comprise comparators 405 and 406, respectively, which compare the modulating signal from the point 3 with the sawtooth at the point 2. Two pulse trains are produced, one, which is fed out at point 4, drives the inverter, the other drives the regeneration or energy return stage. The mode of operation is dictated by the polarity of the summing amplifier output at the point 3. A positive voltage at the point 3 commands power into the load by a pulse train appearing at point 4, whereas a negative voltage at point 3 removes the train at point 4 and places a corresponding pulse train into the regeneration drive opto-coupler.

The circuit K is the opto-isolator output bridge control circuit which feeds the output bridge driver circuit J via opto-couplers comprising four light-emitting diodes 410 and corresponding photo-transistors in the circuits J. The opto-isolators are controlled from a voltage squaring circuit 407 and a two-transistor interface circuit 408. The opto-couplers provide isolation of the output circuits J, H, M and I from the drive circuits, and hence from the d.c. supply.

The function of the circuit O is to drive the inverter push-pull power transistors alternately in response to the pulse-train at point 4. A divide-by-two circuit 409 produces a pair of toggling outputs, at 20 kHz, which are then gated with the pulse train at point 4 to control the two power transistors, via output points 5 and 6.

Figure 6:
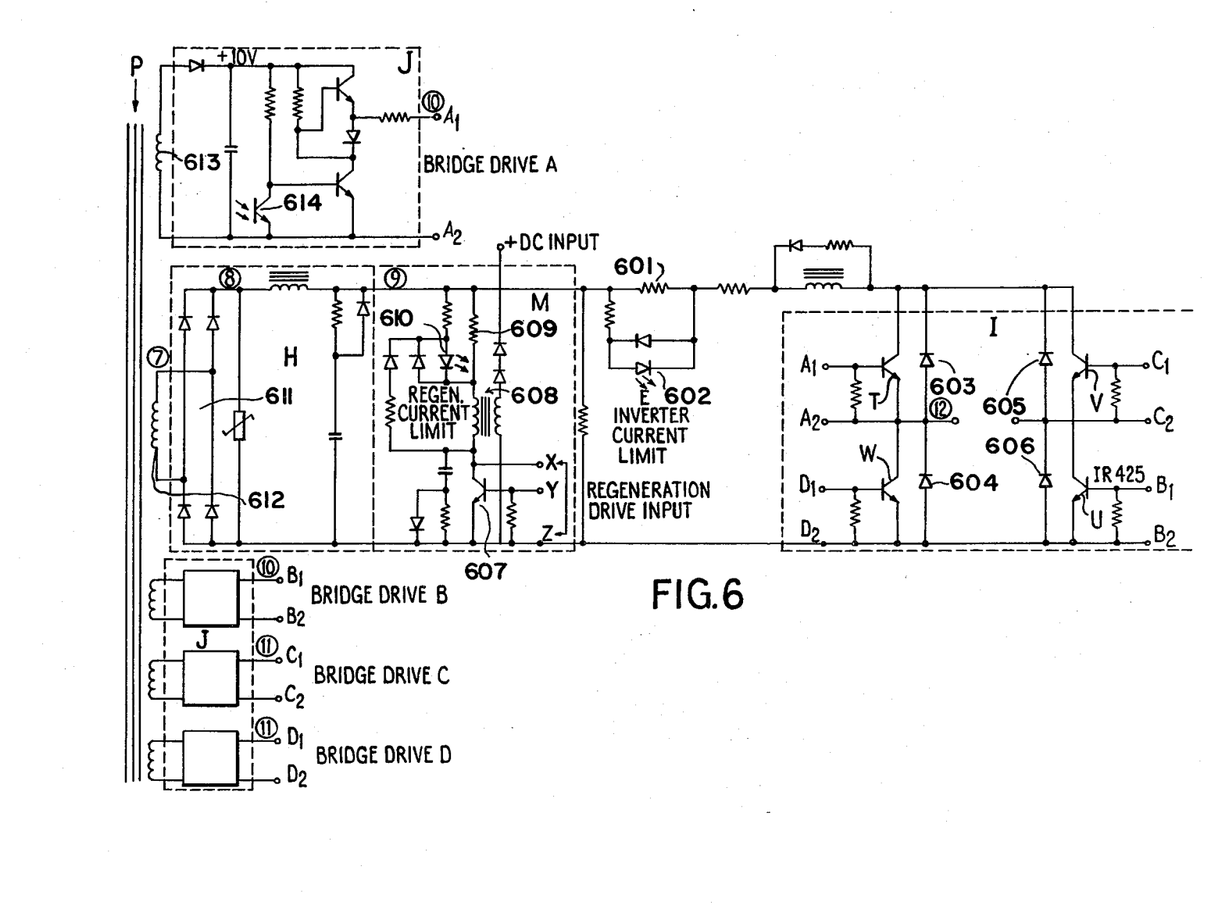

The circuit N is a current limit detector, as previously mentioned. It comprises a photo-transistor 411 which is coupled to a light-emitting diode 602 (FIG. 6). A current shunt 601 (FIG. 6) in series with the unidirectional power waveform at the inverter output point 9 senses current and turns on the light-emitting diode 602 when a predetermined value is reached.

Figure 5A:
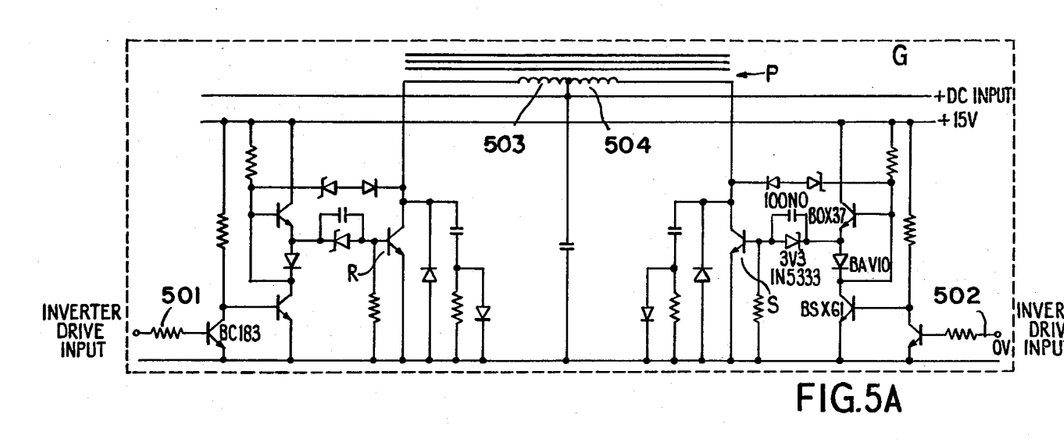
Figure 5B:
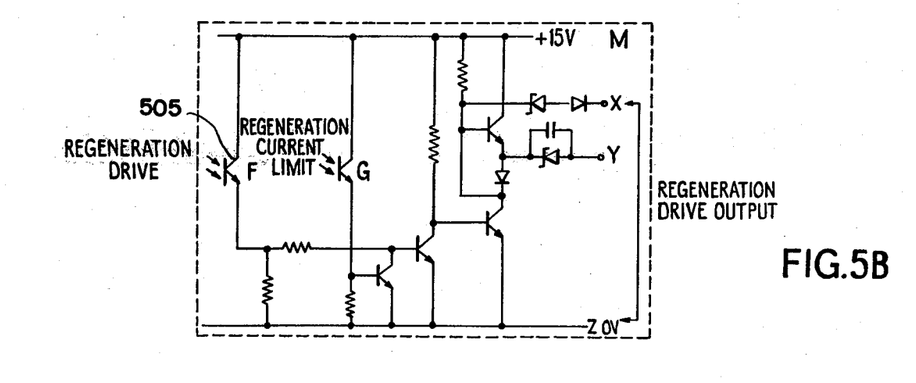

Referring to FIG. 5A, the circuit G is the push-pull stage of the inverter. Power switches R and S are controlled by the drive inputs on lines 501 and 502, respectively, which are connected to output points 5 and 6 of circuit O (FIG. 4). The switches R and S allow current to be passed into primary windings 503 and 504 of the transformer P.

Circuit M (FIGS. 5B and 6) is the regeneration inverter. It comprises a transistor 607 connected in series with a winding of a transformer 608 across the output of the rectifier and filter circuit H. In conjunction with diodes 603-606 in circuit I, this circuit operates as an a.c. to d.c. converter. The circuit configuration is a single-ended flyback converter with current limiting action. This current limiting is achieved by use of a current-shunt 609 and opto-isolator 610 in series with the transformer winding. Operation of the isolator at a predetermined collector current value inhibits the drive to the base of the switching transistor, thus protecting the device. Drive pulses are fed to the circuit M from the circuit L (FIG. 4) via an opto-coupler 505.

The circuit H (FIG. 6) comprises a full-wave diode bridge rectifier 611 which produces an output at the point 8 followed by a low-pass filter. The circuit rectifies and integrates the high frequency component of the waveform from the secondary winding 612 of the transformer P. A unidirectional power frequency waveform is thus produced at the point 9, and this is, in turn, sampled by the circuit E, the summing amplifier, of FIG. 4.

The output switching bridge circuit I comprises four transistors arranged in two diagonal pairs T, U and V, W which pairs conduct alternately in response to the pulses fed to their base electrodes from the respective driver circuits J. The configuration inverts alternate half-cycles of the unidirectional power waveform to form a sine-wave output. The four diodes 603-606 are connected into the bridge circuit in an inverse-parallel configuration to by-pass the power transistors under conditions of reverse-energy flow from the load.

The circuit J is one of four identical drive circuits for driving the respective power transistors of the switching circuit I. The circuits J are isolated from each other by the provision of individual windings on the transformer P, such as the winding 613. The circuits are powered by d.c. obtained by rectification of the pulse-width modulated signals induced in those windings by operation of the inverter G. Drive signals are applied to the output line $A_1$ in response to signals on the opto-isolator 614.

The application of only high-frequency pulses to the transformer P allows the use of a small ferrite core, as mentioned above, thereby reducing the overall size of the equipment considerably. The fact that the frequency of these pulses is above the audible frequency range also means that the transformer does not emit any noise.

We claim:

1. A static inverter for connection to a d.c. supply to provide a relatively low-frequency alternating voltage output, comprising: means to generate a first train of electrical pulses of relatively high frequency; means to cause successive pulses of said first train to represent required successive instantaneous unidirectional amplitudes of the alternating voltage output which is to be provided; a transformer having primary and secondary windings; means to cause the passage through said transformer primary winding of pulses of current from said d.c. supply in response to said first pulse train so that a corresponding second pulse train is induced across said transformer secondary winding; means to produce from said second pulse train a unidirectional voltage having said required instantaneous amplitudes; switching means comprising four switching devices connected in a bridge circuit to which said unidirectional voltage is fed and which cyclically reverses the polarity of said voltage at said relatively low frequency to produce said alternating voltage output; and means operative selectively to by-pass said bridge circuit to provide a reverse path through the inverter from the output to the d.c. supply in the event of excess power being available at the inverter output due to load conditions existing on said output.

2. An inverter as claimed in claim 1, wherein said means to cause successive pulses of said first train to represent said required successive instantaneous unidirectional amplitudes comprises a pulse-width modulator whereby the width of each said successive pulse represents the corresponding required instantaneous unidirectional amplitude.

3. An inverter as claimed in claim 2, wherein said means to cause the passage of current pulses through said transformer primary winding comprises two switching devices operating in a push-pull configuration, said switching devices being controlled alternately by said first pulse train, whereby said second pulse train comprises a sequence of alternately positive and negative pulses.

4. An inverter as claimed in claim 3, including a rectifier circuit coupled to said transformer secondary winding to convert said sequence of alternately positive and negative pulses into a unidirectional pulse train.

5. An inverter as claimed in claim 4, including filter means to which said unidirectional pulse train is fed and which thereby produces said unidirectional voltage having said required instantaneous amplitudes.

6. An inverter as claimed in claim 1, wherein said means to provide a reverse path comprises means responsive to said excess power to produce a train of pulses which are pulse-width modulated in dependence upon the magnitude of said excess power; inverting means to which said pulses are fed and which produces an alternating output; and means to rectify said alternating output and to feed the resulting d.c. regeneration power to the d.c. supply.

7. A static inverter for connection to a d.c. supply to provide a relatively low-frequency alternating voltage output, comprising: means to generate a first train of electrical pulses of relatively high frequency, said generating means comprising means to generate a reference alternating voltage at said relatively low frequency, rectifier means to change said low-frequency alternating reference voltage into a unidirectional waveform, a pulse generator circuit to provide clock pulses at said relatively high frequency and to provide sawtooth pulses at said relatively high frequency for sampling the instantaneous amplitudes of said unidirectional waveform, and a pulse width modulator responsive to said clock pulses and said sawtooth pulses to cause the widths of successive pulses of said first train to represent required instantaneous unidirectional amplitudes of said alternating voltage which is to be provided; a transformer having primary and secondary windings; means to cause the passage through said transformer primary windings of pulses of current from said d.c. supply in response to said first pulse train so that a corresponding second pulse train in induced across said transformer secondary windings; means to produce from said second pulse train a unidirectional voltage having said required instantaneous amplitudes; and switching means to which said unidirectional voltage is fed and which cyclically reverses the polarity of said voltage at said relatively low frequency to produce said alternating voltage output.

8. An inverter as claimed in claim 7, wherein said means to generate a reference alternating voltage comprises a sine wave generator connected in a phase-lock loop configuration.

9. An inverter as claimed in claim 7, wherein said means to cause the passage of current pulses through said transformer primary winding comprises two switching devices operating in a push-pull configuration, said switching devices being controlled alternately by said first pulse train, whereby said second pulse train comprises a sequence of alternately positive and negative pulses.

10. An inverter as claimed in claim 9, including a rectifier circuit coupled to said transformer secondary winding to convert said sequence of alternately positive and negative pulses into a unidirectional pulse train.

11. An inverter as claimed in claim 10, including filter means to which said unidirectional pulse train is fed and which thereby produces said unidirectional voltage having said required instantaneous amplitudes.

12. An inverter as claimed in claim 7, wherein said switching means comprises four switching devices connected in a bridge circuit.

13. An inverter as claimed in claim 12, including means operative selectively to by-pass said bridge circuit to provide a reverse path through the inverter from the output to to d.c. supply in the event of excess power being available at the inverter output due to load conditions existing on said output.

14. An inverter as claimed in claim 13, wherein said means to provide a reverse path comprises means responsive to said excess power to produce a train of pulses which are pulse-width modulated in dependence upon the magnitude of said excess power; inverting means to which said pulses are fed and which produces an alternating output; and means to rectify said alternating output and to feed the resulting d.c. power to the d.c. supply.

15. A static inverter for connection to a d.c. supply to provide a relatively low-frequency alternating voltage output, comprising: means to generate a first train of electrical pulses of relatively high frequency; means to cause successive pulses of said first train to represent required successive instantaneous unidirectional amplitudes of said alternating voltage output which is to be provided; a transformer having primary and secondary windings; means to cause the passage through said transformer primary winding of pulses of current from said d.c. supply in response to said first pulse train so that a corresponding second pulse train is induced across said transformer secondary winding; means to produce from said second pulse train a unidirectional voltage having said required instantaneous amplitudes; switching means to which said unidirectional voltage is fed and which cyclically reverses the polarity of said voltage at said relatively low frequency to produce said alternating voltage output; and means operative selectively to by-pass said bridge circuit to provide a reverse path through the inverter from the output to the d.c. supply in the event of excess power being available at the inverter output due to load conditions existing on said output.

16. An inverter as claimed in claim 15, wherein said means to provide a reverse path comprises means responsive to said excess power to produce an alternating output voltage the amplitude of which represents the magnitude of said excess power; and means to rectify said alternating output voltage and to feed the resulting d.c. power to the d.c. supply.

17. An inverter as claimed in claim 15, wherein said means to cause successive pulses of said first train to represent said required successive instantaneous unidirectional amplitudes comprises a pulse-width modulator whereby the width of each said successive pulse represents the corresponding required unidirectional instantaneous amplitude.

18. An inverter as claimed in claim 17, including means to generate a reference alternating voltage at said relatively low frequency; a full-wave rectifier to change said low frequency alternating reference voltage into a unidirectional waveform; and a clock pulse generator circuit to provide said first pulse train and to provide a sawtooth waveform at said relatively high frequency for sampling the instantaneous amplitudes of said unidirectional waveform to control said pulse width modulation.

19. An inverter as claimed in claim 18, wherein said means to generate a reference alternating voltage comprises a sine wave generator connected in a phase-lock loop configuration.

20. An inverter as claimed in claim 17, wherein said means to cause the passage of current pulses through said transformer primary winding comprises two switching devices operating in a push-pull configuration, said switching devices being controlled alternately by said first pulse train, whereby said second pulse train comprises a sequence of alternately positive and negative pulses.

21. An inverter as claimed in claim 20, including a rectifier circuit coupled to said transformer secondary winding to convert said sequence of alternately positive and negative pulses into a unidirectional pulse train.

22. An inverter as claimed in claim 21, including filter means to which said unidirectional pulse train is fed and which thereby produces said unidirectional voltage having said required instantaneous amplitudes.

23. An inverter as claimed in claim 15, wherein said means to provide a reverse path comprises means responsive to said excess power to produce a train of pulses which are pulse-width modulated in dependence upon the magnitude of said excess power; inverting means to which said pulses are fed and which produces an alternating output; and means to rectify said alternating output and to feed the resulting d.c. power to the d.c. supply.

24. An inverter as claimed in claim 15, wherein said switching means comprises four switching devices connected in a bridge circuit.

* * * * *